United States Patent
Judkins et al.

(10) Patent No.: US 7,981,235 B2
(45) Date of Patent: Jul. 19, 2011

(54) METHOD AND APPARATUS FOR MAKING CELLULAR MATERIAL USING SLOW CURE ADHESIVES

(75) Inventors: Ren Judkins, Pittsburgh, PA (US); John D. Rupel, Pine River, WI (US)

(73) Assignee: Ren Judkins, Pittsburgh, PA (US)

( * ) Notice: Subject to any disclaimer, the term of this patent is extended or adjusted under 35 U.S.C. 154(b) by 705 days.

(21) Appl. No.: 10/568,027

(22) PCT Filed: Sep. 2, 2004

(86) PCT No.: PCT/US2004/028557
§ 371 (c)(1),
(2), (4) Date: Jul. 31, 2006

(87) PCT Pub. No.: WO2005/021242
PCT Pub. Date: Mar. 20, 2005

(65) Prior Publication Data
US 2007/0051456 A1    Mar. 8, 2007

Related U.S. Application Data

(60) Provisional application No. 60/499,478, filed on Sep. 2, 2003.

(51) Int. Cl.
*B32B 37/00* (2006.01)
(52) U.S. Cl. ......... 156/191; 156/184; 156/189; 156/193
(58) Field of Classification Search .................. 156/195, 156/193, 185, 174, 184, 189, 191
See application file for complete search history.

(56) References Cited

U.S. PATENT DOCUMENTS

| | | | |
|---|---|---|---|
| 4,631,108 A | 12/1986 | Colson | |
| 4,677,012 A | 6/1987 | Anderson | |
| 4,732,630 A * | 3/1988 | Schnebly | 156/64 |
| 4,838,972 A * | 6/1989 | Daamen et al. | 156/175 |
| 5,002,628 A | 3/1991 | Schnebly | |
| 5,390,720 A * | 2/1995 | Colson et al. | 160/84.07 |
| 6,024,819 A | 2/2000 | Corey | |
| 6,319,586 B1 * | 11/2001 | Colson | 428/116 |
| 6,660,376 B1 * | 12/2003 | Zimmel et al. | 428/355 N |
| 2002/0014296 A1 * | 2/2002 | Corey | 156/73.4 |
| 2004/0065416 A1 * | 4/2004 | Auger et al. | 160/84.05 |

FOREIGN PATENT DOCUMENTS

JP    9-76378 A  *  3/1997

OTHER PUBLICATIONS

Machine translation of Japanese Patent 9-76378, pp. 1-7, date unknown.*

* cited by examiner

*Primary Examiner* — Jeff H Aftergut
(74) *Attorney, Agent, or Firm* — Buchanan Ingersoll & Rooney PC

(57) ABSTRACT

A cellular structure is formed on a wheel from an elongated tubular structure. At least one longitudinal line of a slow cure adhesive is applied to the exterior surface of the elongated tubular material. Then the material is wrapped around a collector in a manner to cause the adhesive to be positioned between overlying surfaces of the elongated tubular material and to form a cellular structure on the collector. The cellular structure is cut from the collector before the adhesive has fully cured and is placed on a flat surface where the adhesive has fully cured.

8 Claims, 3 Drawing Sheets

METHOD AND APPARATUS FOR MAKING CELLULAR MATERIAL USING SLOW CURE ADHESIVES

This application is a national stage application of PCT/US04/28557 filed Sep. 2, 2004 which claims the benefit of U.S. provisional application No. 60/499,478 filed Sep. 2, 2003.

BACKGROUND OF THE INVENTION

1. Field of the Invention

This invention relates generally to methods and machinery used to fabricate cellular materials, particularly those cellular materials used in window coverings.

2. Description of the Prior Art

Cellular window coverings are well known in the art. These products have a series of interconnected cells usually made from fabric material. Typically, these products are made by folding and gluing sheets or strips of material to create a cellular structure or by connecting a series of webs between two parallel sheets.

One type of cellular window covering is constructed by folding over the edges of flat sheets of material and gluing the free edges to form a cell, or multi-cellular structure, and then stacking and gluing the cells on top of each other to form the cellular window covering. The cells can then be cut to the width of the window in which it will be installed. Related U.S. Pat. Nos. 4,631,108 and 4,450,027 to Colson discloses a method and apparatus for fabricating expandable honeycomb insulation panels from a continuous length of thin plastic film. The film is folded into a tubular structure by folding opposite lateral edges of the film onto one side. An adhesive is applied to at least one side of this structure. Then the tubular structure is continuously wrapped around a rotating arm under constant tension in an effective, uniform manner that eliminates internal stresses that could otherwise cause warps or wrinkles. The tubular structure is continuously stacked in layers on a flat surface or a plurality of flat surfaces to eliminate any curves that might cause wrinkles or warps in the finished product. The apparatus includes an initial creaser assembly in which a pair of spaced-apart sharp wheels are pressed into the film to form uniform creases where the film material will be folded. It also includes a folding assembly to fold the lateral edges at the crease over the mid-portion thereof and a press assembly to mechanically crimp the folds. The apparatus contains a heat setting assembly for heating the plastic film material to a sufficiently high temperature so that it looses its elasticity and becomes sufficiently plastic to permanently set the folds therein. A drive assembly pulls the plastic film through the folding and heat setting assemblies, and a positive displacement pump feeds a liquid adhesive through an applicator for deposition onto the surface of the folded tubular plastic film. The pump is driven from the film drive assembly so that the rate of deposition of the adhesive material on the film is always in direct relation to the rate of speed in which the film moves through the apparatus in order to maintain uniform beads of adhesive for clean cut glue lines in the finished panel product. The apparatus also includes a rotatable stacking arm having two spaced apart flat surfaces connected by curved ends. A tension and speed control assembly maintains a constant tension of the film as it is stacked uniformly in layers on the rotating arm or stacking bed. After a sufficient amount of film is wrapped around the arm cuts are made through the stack to remove from the arm the cellular structure that has been formed.

A significant shortcoming of the method and apparatus disclosed by Colson is that only the cellular material that has been formed on the flat surfaces can be used for window covering products. This is so because the cells in the material stacked on the curved ends of the arm retain some of their curvature. If this material were attached to a headrail and hung in front of a window the curves in the cells would be quite noticeable and unattractive. Nevertheless, the process and machine disclosed by Colson continues to be used commercially. Those users simply scrap the material that is cut from the curved ends of the arm. It is quite common for 15% to 20% of the starting material cut from the ends of the rotating arm to be and scrapped in this process. Additional waste results from another limitation of this process. The stacks of material cut from the flat surfaces of the arm have a width not greater than the length of each flat surface. The height of the stack is limited by the distance between the ends of the arm and the factory floor when that end is at its lowest position. After the stacks are removed from the rotating arm they must be cut to provide a panel of cellular material having a width and length equal to the size of the shade being made. Often two or more panels can be cut from each stack. Yet, seldom is the entire stack used to make the desired panels. Twenty to twenty-five percent of a stack can be excess material that is scrapped. Consequently, 35% to 45% of the starting material used in the process and machine disclosed by Colson is wasted.

Another method and apparatus for malting cellular products is disclosed by Rasmussen in U.S. Pat. No. 3,963,549. In this method material is wound around two spaced apart drums. Lines of an adhesive are applied to the material prior to being wound. As a result overlaying surfaces of the material are bonded together at the glue lines forming a cellular structure. After a desired amount of material has been collected the material is cut and removed from the apparatus. The results are similar to that produced by Colson. The structure created on the drums is curved and cannot be used for window covering products.

Another method for manufacturing honeycomb materials in which a continuous length of material is wrapped on a wheel is disclosed by Schnebly in U.S. Pat. No. 4,732,630. The continuous length of material is folded along opposite side portions thereof into a generally flat tubular form. Adhesive is then applied along the length of the continuous material by first heating the material, applying the adhesive in a liquid state to the heated material, and then cooling the material to solidify the adhesive. The folded tubular material with solidified adhesive lines thereon is then wound about a rack in such a manner that the tubular material is deposited in a plurality of continuous layers one on another with the lines of adhesive being disposed between adjacent layers. The wound layers are then radially cut and placed in a vertically aligned stack while they are removed from the rack. The vertically stacked layers are then heated to a temperature sufficient to activate the lines of adhesive and bond the layers together. Finally, the stacked tubular material is cooled to form a unitary stack of tubular, expandable honeycomb material. This process is time consuming and expensive because the material and adhesive must be heated twice. Another problem is that the material and adhesive expand and contract at different rates. Consequently, the cellular structure will be wrinkled with the amount of wrinkles being dependent upon the materials used and the placement of the adhesive. Less wrinkling will occur if the cells are symmetrical and the adhesive is along a longititudinal centerline of the cells. The process is not practical for making a tabbed cell.

A principal advantage of the methods and apparatus disclosed by Colson, Rasmussen and Schnebly is their production capacity. The machines can be operated at relatively high speeds such that the material is being wound at speeds of 500 to 1000 feet per minute. Thus, there is a need for a machine that can rapidly produce cellular products from tubular structures without high scrap rates. The process should be able to produce wrinkle-free cellular structures of all types of cells.

SUMMARY OF THE INVENTION

I provide a method of making a honeycomb structure from an elongated tubular structure that is wound on a wheel or similar collector. At least one longitudinal line of a slow cure adhesive is applied to the exterior surface of the elongated tubular material before that material is placed on the wheel. The elongated tubular structure is wrapped around the collector in a manner to cause the adhesive to be positioned between overlying surfaces of the elongated tubular material and to form a cellular structure on the collector. At least one transverse cut is made through the elongated tubular structure that has been wrapped around a collector before the adhesive has fully cured. The honeycomb structure is removed from the collector and placed on a flat surface before the adhesive has fully cured. The adhesive fully cures while the honeycomb structure is on the flat surface. If a single cut is made to remove the cellular structure from the wheel, that structure will have a width corresponding to the circumference of the wheel. Since the adhesive cures while the stack is on a flat surface any initial curvature in the stack will decrease as gravity causes the stack to flatten. Sufficient flattening should occur so that any material curvature in the stack is not noticeable.

I prefer to use a wheel or similar collector in which the curved surfaces have a radius of at least 16.5 feet or 5 meters. The resulting cellular structure will be about 100 feet wide and then can be cut along any selected lines through the stack into sections having a length equal to the width of the cellular shade being produced. The number of wraps on the collector will determine the length of each section.

It is not necessary that the wheel be perfectly circular. Indeed, in a present preferred embodiment we use a wheel having four flat sides connected by curved corners having a radius of one foot or 0.34 meters.

Other objects and advantages of the invention will become apparent from a description of certain present preferred embodiments thereof shown in the drawings.

DETAILED DESCRIPTION OF THE PREFERRED EMBODIMENTS

The process begins with the provision of an elongated cellular structure that can be wound on the collector. This cellular structure can be formed in any manner. The tubular structure may be made from a strip that is folded into a tube immediately prior to being wrapped on the collector such as is disclosed by Colson. The tubular material could be extruded rather than formed from a strip. Separately produced rolls of tubular material could be used.

Figure 1:
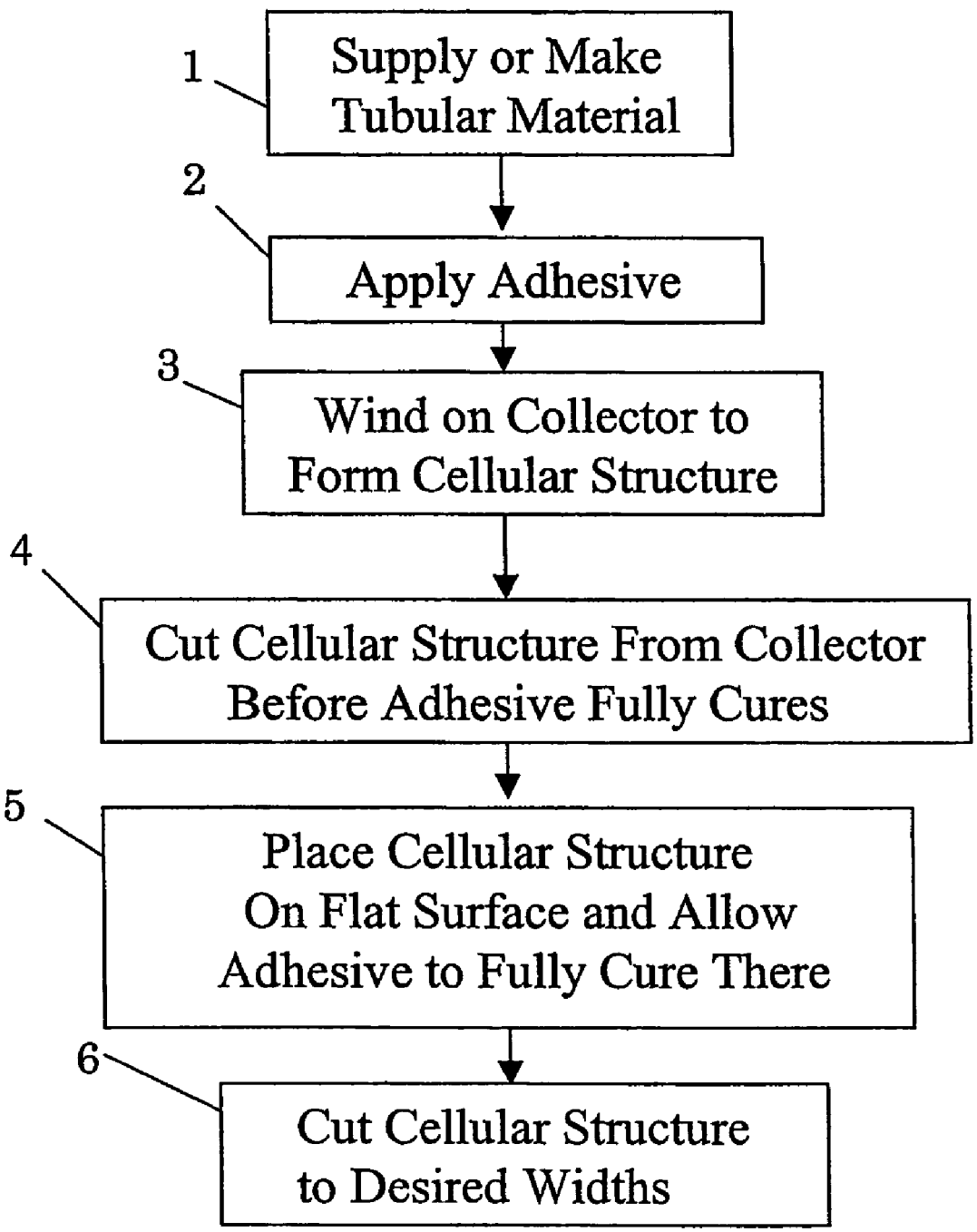
FIG. 1 is a block diagram of a present preferred method for forming the cellular structure of the present invention.

Referring to FIG. 1, a supply of tubular material 1 is provided or made. That tubular material is directed past one or more glue heads that place at least one line of adhesive on the outer surface of the tubular material indicated by box 2. The adhesive is tacky but not fully cured. That material is then wound on the collector to form a cellular structure as indicated by box 3. After a desired amount of material has been wrapped onto the collector, it is stopped and at least one transverse cut is made through the cellular structure indicated by box 4. This step is performed before the adhesive has fully cured. In the next step 5 the cellular structure is placed on a flat surface and the adhesive fully cures. Since the adhesive has not fully cured when the cellular structure is placed on the flat surface, any curvature that was imparted into the cells during the winding step is not set. Accordingly, the cells lose much if not all of that curvature when the cellular structure is placed on a flat surface. For that reason the cells appear to have no curvature in the final cellular structure. After the adhesive has fully cured the cellular structure is cut into segments of desired width for fabrication into a cellular shade. Although the cutting step 6 is shown in FIG. 1 to occur after the cellular structure has been cut from the collector, these final cuts can be made as part of the process of removing the structure from the collector.

The cellular structure that is formed on the wheel could be a single cell or multiple cell structure. Furthermore, the cellular structure could be cut along one or more planes parallel to the front and rear of the stack. Two pleated panels can be made from a single cell structure. If the original stack is a double cell or triple cell structure the planar cuts could produce panels, single cell or double cell structures.

Figure 2:
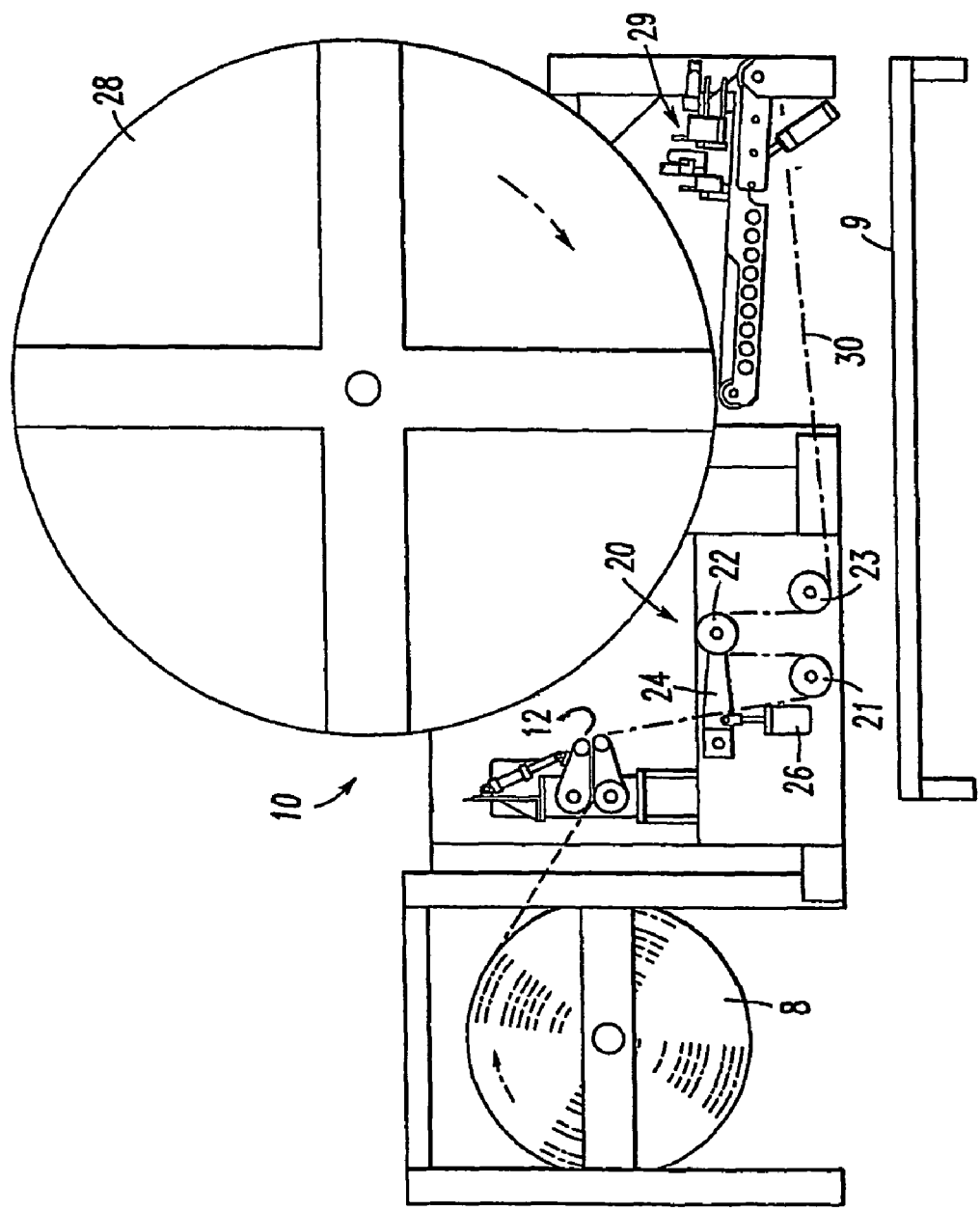
FIG. 2 is a side view of a present preferred apparatus for making the cellular structure.

The cellular structure here disclosed can be made in a fully automated process using a machine like that shown in FIG. 2. In this machine a supply of tubular material is provided on one or more rolls 8 that typically are about four feet or 1.2 meters in diameter. The tubular material is directed from the supply roll 8 to the fabricating machine 10. As the material enters the machine 10 it pass over drive mechanism 12 that pulls the material from the roll 8. The material is then directed to an accumulator 20. The accumulator has two fixed wheels or rollers 21 and 23 and a movable wheel or roller 22. This wheel 22 is attached to the end of arm 24. That arm is pivotably attached to the frame. A hydraulic cylinder 26 is provided to move the end of the arm 24 containing wheel 22 up and down. In this manner the length of the path of the tubular material, indicated by chain line 30, can be lengthened or shortened between wheels 21 and 23. A glue system 29 applies the glue beads to the tubular material just prior to the material being wound on wheel 28. Because there is at least one glue bead on the material being wound on the wheel, the overlapping surfaces are bonded together at the glue line as the material is wrapped onto the wheel to form a cellular structure. The glue bead or beads can be located to produce cells that are symmetrical or non-symmetrical. For example, cells can be made to be D-shaped with the front walls of the cell being larger than the rear walls. When a desired amount of material has been wrapped around the wheel the machine is stopped. Then the stack is cut to remove the cellular structure from the wheel. A table 9 is located near the wheel 28 to provide a flat surface on which at least a portion of the cellular structure is placed after being cut from the wheel. The table may be designed to move below the wheel after the wheel has been stopped to receive the cellular structure after that structure has been cut from the wheel.

Depending upon how much material is placed on the wheel and the speed at which the wheel turns, twenty minutes to over an hour may pass from the time the tubular material receives the glue bead until the stack is placed onto the table. The adhesive used in the present process takes an initial set as the tubular material is wrapped onto the wheel. However, the final set does not occur until after the stack has been placed upon the table. When the stack is first placed on the table the adhesive may creep allowing the cells in the stack to flatten. If desired a weight could be placed on top of the stack to encourage or accelerate the adhesive creep and flattening of the cells. After the adhesive is fully cured the stack is cut into panels of selected sizes and each panel is attached to a headrail and usually also attached to a bottomrail. Then lift cords are provided to complete the shade. This work could be done on table 9.

I prefer that the wheel have a diameter of at least 33 feet or about 10 meters. A wheel 33 feet or 10 meters in diameter will produce a cellular structure of nearly 104 feet or about 10 meters in length if cut from the wheel using a single cut. Therefore, an operator may wish to make two or more cuts in the cellular structure while it is on the wheel to produce smaller lengths that are easier to handle. Somewhat smaller diameter wheels could be used for some materials. However, wheels having a diameter of less than 15 feet or 4.5 meters are likely to place so much curvature in the cells as they are being formed on the wheel that the fabric will wrinkle when placed on the flat surface rather than assume a clean straight shape. If desired, the wheel could have flat surfaces around its circumference on which the tubular material is wrapped. Such a wheel may appear to be elliptical rather than circular. However, the ratio of the major diameter to the minor diameter of such a wheel should not be more than two. A present preferred wheel having four flat surfaces is shown in the machine 40 of FIG. 3.

Figure 3:
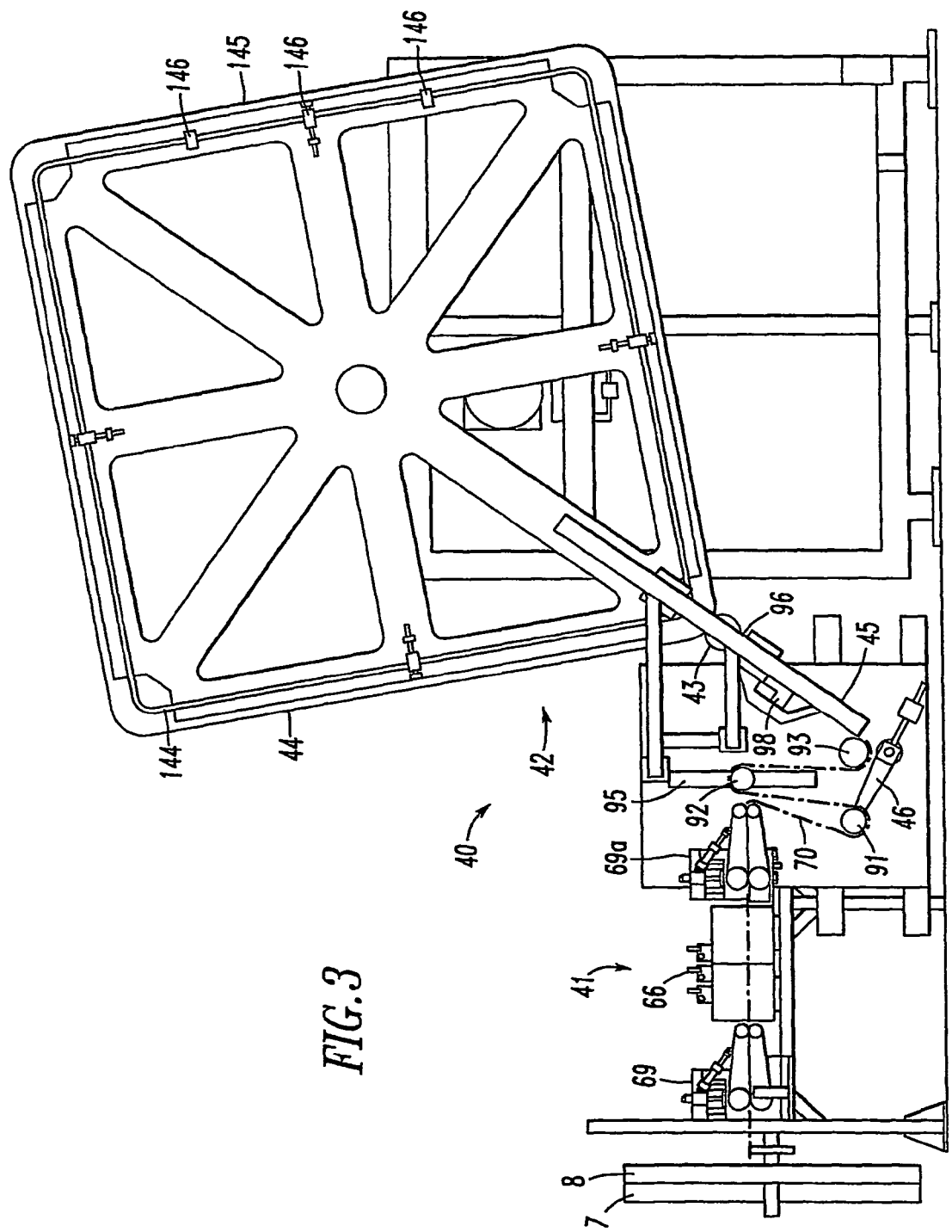
FIG. 3 is a side view of a second present preferred apparatus for making the cellular structure.

Referring to FIG. 3, the machine 40 has a first section 41 in which the tubular structure is formed from rolls of fabric 7 and 8 and a second section 42 in which the tubular structure is wound onto a collector. The strips of fabric are turned and folded into a V-shape as they enter pull conveyor 69. They pass under strand making assembly 66 where the tubes are formed and go onto the second pull conveyor 69a. The tubular structure follows path 70 shown in dotted line around wheels 91, 92 and 93 to the lay-on wheel assembly carried on sliding arm 45 which runs on track 96. The lay-on wheel assembly has a glue applicator 98 that applies glue to the tubular structure and then directs the tubular structure onto the collector wheel 44. The collector wheel 44 has four flat sides connected by curved corners.

The tubular structure is applied to the collector by a lay-on wheel 43 attached to a slide assembly 45. This arm can move toward and away from the collector to accommodate the changing diameter of the turning wheel. A spring (not shown) keeps the lay-on wheel 43 on the collector wheel 44. The tubular structure always meets the collector wheel at a 90° angle. Consequently, the pressure applied by the lay-on wheel 43 to press the tubular structure against material on the collector is substantially the same throughout the revolution of the collector. Accordingly, the glue bead between adjacent structures should be uniform in width. A track 144 is provided on the collector wheel. A pin (not shown) connected to slide 45 rides in the track and keeps the slide 45 and lay-on wheel 43 aligned with the collector wheel 44. Arm 46 can move wheel 91. Wheel 92 is movable in track 95 to provide an accumulator or dancer. The dancer enables the speed of the webs to remain constant through the first portion 41 of the machine. We also provide a variable speed motor to turn the collector wheel. Sensors could monitor the position of the collector wheel 44 and the speed of the tubular material moving through the machine. Information from these sensors could then be processed by a controller that signals the motor to change speed. Rather than rely upon sensors, we prefer to provide a master drive. The master drive is connected to the motors in pull conveyors 96 and 96a that drive the webs through the tube forming steps and to the motor that drives the wheel collector 44. This connection could be mechanical but preferably is electronic. Consequently, the speed of the machine can be increased or decreased by changing the speed of the master drive. The motor which turns the collector wheel is controlled by a controller containing software which changes the rotational speed of the collector wheel to accommodate the change in diameter of the wheel. The machine can operate at speeds in which the webs and tubular structure travel at from 200 to 500 feet per minute.

The rim 145 of the collector wheel 44 is not a flat surface but is curved in both the longitudinal and transverse directions. The longitudinal curvature is preferably a change of one inch per 104 inches. In a preferred embodiment of the collector the flat portions of the rim are flexible. Screws 146 are provided for each flat segment which enable the center of the segment to be moved up or down. In this way, a concave or convex curvature can be created. The transverse curvature could be concave if a single glue line is applied to the tubular structure because the stack on the collector wheel would be thicker in the center. If multiple glue lines are applied to the tubular material, then the center of the stack will have less material. In this situation a convex transverse curvature is provided on the rim. Another option is to provide pins on the rim of the wheel that simulate a curved surface.

There are currently available slow cure adhesives that are tacky when applied but do not set for several hours. The choice of adhesive will depend upon the fabric from which the tubular material is made. An aromatic polyurethane moisture cure adhesive made by Forbo can be used for nonwoven fabric. This is a polyurethane adhesive that fully sets to about 70% of its strength in the first ten minutes, but does not fully cure for two to four hours. The cure time for the adhesive used in this method must be long enough to enable the cellular structure to be removed from the wheel and placed on a flat surface before the adhesive fully cures. For any commercial operation the cure time must be at least one, and preferably at least two to four hours. That time may be longer, but typically is shorter than one day. Although we prefer to use polyurethane adhesives, slow cure polyester adhesives can also be used. Adhesives that must be oven cured are not desirable because of the additional handling required.

While certain present preferred embodiments have been shown and described, it is distinctly understood that the invention is not limited thereto but may be otherwise embodied within the scope of the following claims.

We claim:

1. A method of making a honeycomb structure comprising:
    providing an elongated tubular material having an exterior surface,
    applying at least one longitudinal line of an adhesive to the exterior surface of the elongated tubular material, the adhesive being a slow cure adhesive that will not fully cure for at least one hour,
    wrapping the elongated tubular material around a collector on a surface having at least one curved portion in a manner to cause the adhesive to be positioned between and bond to overlying surfaces of the elongated tubular material and to form a cellular structure on the collector, the cellular structure having a curvature, making at least one transverse cut through the cellular structure, the cut being made before the adhesive has fully cured, placing the cellular structure on a flat surface before the adhesive has fully cured, and allowing the adhesive to fully cure while the cellular structure is on the flat surface such that the curvature in the cellular structure will flatten while the adhesive fully cures.

2. The method of claim 1 wherein the tubular material is a material selected from the group consisting of woven fabrics, non-woven fabrics, knits and films.

3. The method of claim 1 also comprising attaching at least a portion of the cellular structure to a headrail.

4. The method of claim 1 also comprising cutting the cellular structure to form a plurality of cellular structures of smaller width.

5. The method of claim 4 wherein the cellular structure is cut while the cellular structure is on the flat surface.

6. The method of claim 1 wherein the adhesive is polyurethane adhesive having a curing time of at least 4 hours.

7. The method of claim 1 wherein the adhesive has a curing time of at least 4 hours.

8. The method of claim 1 wherein the collector is a wheel on which the elongated tubular structure is wrapped.

* * * * *